(12) United States Patent
Kawashima

(10) Patent No.: US 12,541,873 B2
(45) Date of Patent: Feb. 3, 2026

(54) INFORMATION PROCESSING APPARATUS AND INFORMATION PROCESSING METHOD

(71) Applicant: SONY GROUP CORPORATION, Tokyo (JP)

(72) Inventor: Manabu Kawashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 557 days.

(21) Appl. No.: 17/999,217

(22) PCT Filed: May 7, 2021

(86) PCT No.: PCT/JP2021/017497
§ 371 (c)(1),
(2) Date: Nov. 18, 2022

(87) PCT Pub. No.: WO2021/241166
PCT Pub. Date: Dec. 2, 2021

(65) Prior Publication Data
US 2023/0222686 A1 Jul. 13, 2023

(30) Foreign Application Priority Data

May 29, 2020 (JP) .................................. 2020-093887

(51) Int. Cl.
*G06T 7/73* (2017.01)
*G06T 7/194* (2017.01)
(Continued)

(52) U.S. Cl.
CPC ................ *G06T 7/73* (2017.01); *G06T 7/194* (2017.01); *G06V 10/44* (2022.01); *G06V 10/761* (2022.01); *G06T 2207/20084* (2013.01)

(58) Field of Classification Search
CPC ........ G06V 10/761; G06V 10/44; G06T 7/74; G06T 7/194; G06T 7/579; G06T 7/711;
(Continued)

(56) References Cited

U.S. PATENT DOCUMENTS

2019/0007670 A1* 1/2019 Sakurai ................ H04N 13/207

FOREIGN PATENT DOCUMENTS

JP 2016-177388 A 10/2016
JP 2018022247 A * 2/2018
(Continued)

OTHER PUBLICATIONS

International Search Report and Written Opinion of PCT Application No. PCT/JP2021/017497, issued on Aug. 3, 2021, 09 pages of ISRWO.

*Primary Examiner* — Tracy Mangialaschi
(74) *Attorney, Agent, or Firm* — CHIP LAW GROUP

(57) ABSTRACT

Provided is an information processing apparatus that includes a background weight calculation unit and a position/orientation estimation unit. The background weight calculation unit calculates, for each of a plurality of feature points included in a photographic image, a weight corresponding to a probability that the feature point is a point on a stationary subject forming a background of the photographic image. Based on a calculation result reflecting the weight of each of the feature points, the position/orientation estimation unit compares the photographic image with information regarding a keyframe image registered in an environmental map, and estimates position and orientation of the device that has captured the photographic image (IM).

10 Claims, 7 Drawing Sheets

(51) Int. Cl.
*G06V 10/44* (2022.01)
*G06V 10/74* (2022.01)

(58) Field of Classification Search
CPC . G06T 7/73; G06T 7/143; G06T 2207/20084; G06T 2207/30252
See application file for complete search history.

(56) References Cited

FOREIGN PATENT DOCUMENTS

| | | | |
|---|---|---|---|
| JP | 2019-011971 A | 1/2019 | |
| JP | 2019204163 A | * | 11/2019 |

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2021/017497 filed on May 7, 2021, which claims priority benefit of Japanese Patent Application No. JP 2020-093887 filed in the Japan Patent Office on May 29, 2020. Each of the above-referenced applications is hereby incorporated herein by reference in its entirety.

FIELD

The present invention relates to an information processing apparatus, an information processing method, and a program.

BACKGROUND

There is a known technique of estimating a position and orientation of a device using simultaneous localization and mapping (SLAM).

CITATION LIST

Patent Literature

Patent Literature 1: JP 2016-177388 A

SUMMARY

Technical Problem

The estimation of the position and orientation is performed by collating a photographic image, that is, an image captured by the device with an environmental map. However, when a moving subject is included in the photographic image, it might be difficult to perform collation of the photographic image with the environmental map, leading to deterioration of position/orientation estimation accuracy.

In view of this, the present disclosure proposes an information processing apparatus, an information processing method, and a program capable of improving the position/orientation estimation accuracy.

Solution to Problem

According to the present disclosure, an information processing apparatus is provided that comprises: a background weight calculation unit that calculates, for each of a plurality of feature points included in a photographic image, a weight according to a probability that the feature point is a point on a stationary subject forming a background of the photographic image; and a position/orientation estimation unit that compares the photographic image with information regarding a keyframe image registered in an environmental map based on a calculation result reflecting the weight of each of the feature points, and estimates a position and orientation of a device that has captured the photographic image. According to the present disclosure, an information processing method in which an information process of the information processing system is executed by a computer, and a program for causing the computer to execute the information process of the information processing system, are provided.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

Note that the description will be given in the following order.

[1. First embodiment]
[1-1. Configuration of information processing system]
[1-2. Information processing method]
[1-3. Effects]
[2. Second embodiment]
[3. Third embodiment]
[4. Configuration example of computer]

1. First Embodiment

[1-1. Configuration of Information Processing System]

Figure 1:
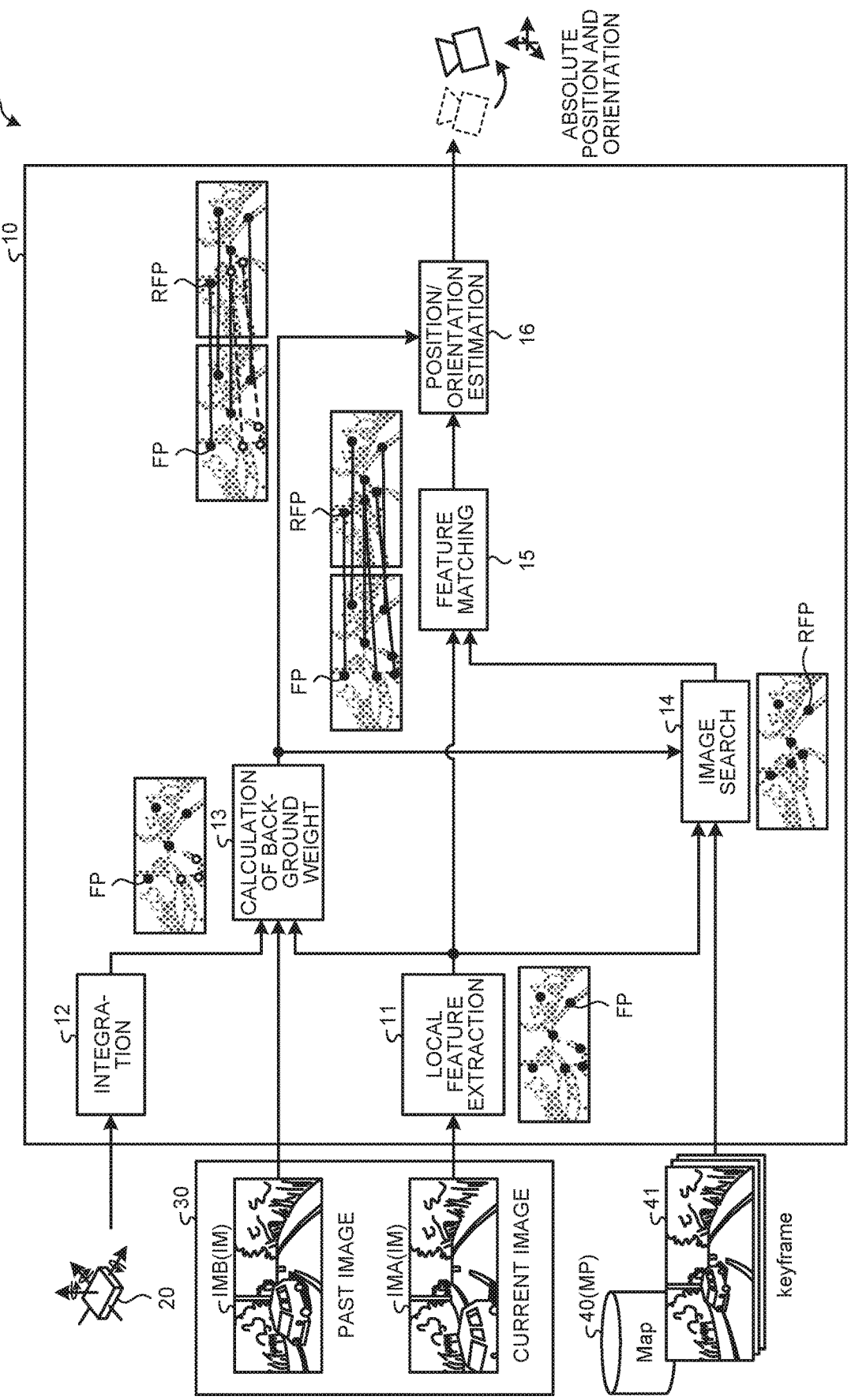
FIG. 1 is a schematic diagram of an information processing system according to a first embodiment.
Figure 2:
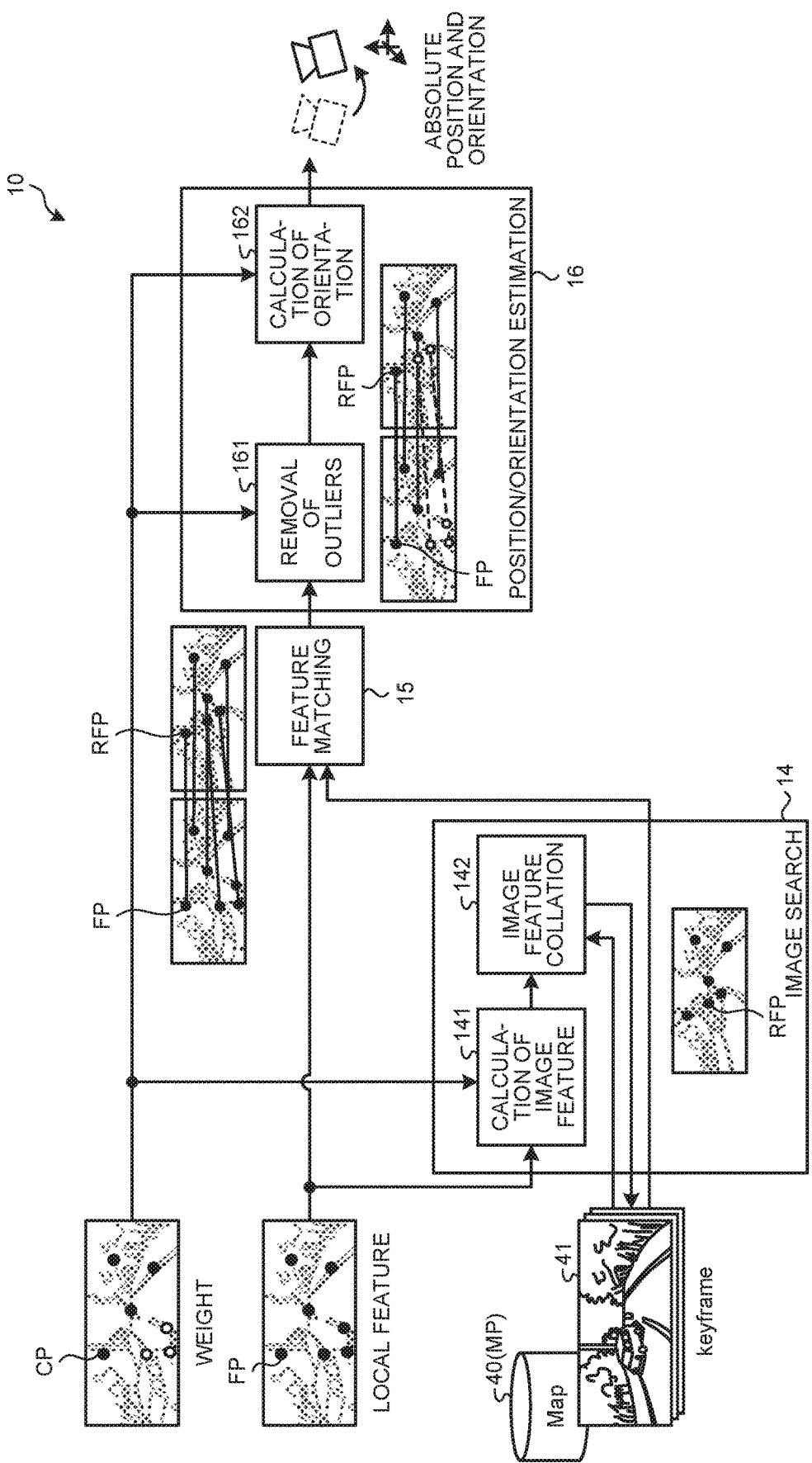
FIG. 2 is a diagram illustrating an image search function and a position/orientation estimation function of the information processing system.

FIG. 1 is a schematic diagram of an information processing system 1 according to a first embodiment. FIG. 2 is a diagram illustrating an image search function and a position and orientation estimation function of the information processing system 1.

As illustrated in FIG. 1, the information processing system 1 includes a processing unit 10, an inertial measurement unit (IMU) 20, a camera 30, and a storage unit 40, for example.

The processing unit 10 is an information processing apparatus that uses SLAM to estimate a position and orientation (a position and a shooting orientation on an environmental map MP) of a device equipped with the IMU 20 and the camera 30. The SLAM includes: a visual inertial odometry (VIO) process of obtaining a change amount of a position and orientation (orientation change amount) from measurement information regarding the camera 30 and the IMU 20; and a localization process of obtaining a position and orientation by searching for a keyframe image 41 similar to a current image IMA (a photographic image IM of a current frame) from among a keyframe image group captured and stored during movement.

The VIO process calculates the current position and orientation by integrating the orientation change amount from the past to the present. In this method, errors are also integrated, resulting in an increase in the deviation from the correct trajectory over time.

The localization process calculates the position and orientation of the device by using the environmental map MP stored in the storage unit 40. The environmental map MP is generated using a plurality of keyframe images 41 captured in the past. In the environmental map MP, image information (keyframe information) regarding the keyframe image 41 is registered in association with the position and orientation at imaging of the keyframe image 41. The keyframe information includes, for example, information regarding positions of a plurality of feature points (registered feature points) RFP included in the keyframe image 41, local features (registered local features) in each of the feature points RFP, and image feature amounts (registered image feature amounts) calculated based on the local features in each of the feature points RFP.

The feature point RFP and the local features are extracted using a known method such as Scale-Invariant Feature Transform (SIFT). The image feature amounts are calculated using a known method such as Bag of Visual Words (BoVW), or Vector of Locally Aggregated Descriptors (VLAD) which is an evolved form of BoVW.

In the localization process, the current image IMA and the keyframe image 41 are compared with each other to calculate a relative relationship (relative position and orientation) between an imaging position and orientation of the keyframe image 41 (position and orientation of the device when imaging is performed) and an imaging position and orientation of the current image IMA. In the localization process, the calculated relative position and orientation is added to the position and orientation associated with the keyframe image 41, thereby calculating the imaging position and orientation of the current image IMA. This cancels the error accumulated by the VIO process.

However, since the imaging time points of the current image IMA and the keyframe image 41 are far apart, it is difficult to detect a disturbance (for example, a moving object) that adversely affects the estimation of the position and orientation from the two images. Conventionally, hypothesis verification by random sample consensus (RANSAC) is performed to reduce the impact of the disturbance. However, when there are a large number of disturbances in the image, it is necessary to greatly increase the number of verification trials. Therefore, it is necessary to reduce the number of times of verification trials by terminating with a fixed number of times, or the like, leading to a failure in sufficiently eliminating the impact of disturbances.

To handle this, the processing unit 10 determines, for each of a plurality of feature points FP included in the current image IMA, whether the feature point FP belongs to the foreground (moving subject) with high probability or the feature point FP belongs to the background (stationary subject) with high probability. The processing unit 10 highly prioritizes the information regarding the feature point FP having a high probability of belonging to the background so that the background information is to be strongly reflected in the calculation result of the position and orientation.

The processing unit 10 includes a local feature extraction unit 11, an integration processing unit 12, a background weight calculation unit 13, an image search unit 14, a feature matching unit 15, and a position/orientation estimation unit 16.

The local feature extraction unit 11 acquires time-series image data captured by the camera 30. The time-series image data includes photographic images IM captured in time series at a plurality of time points. The local feature extraction unit 11 extracts a plurality of feature points FP from the current image IMA. The local feature extraction unit 11 extracts the local feature of each feature point FP. The feature point FP is, for example, a corner point where image edges intersect in the current image IMA. The local feature is, for example, a feature of an image (image patch) of a small region centered on the feature point FP. Examples of an adoptable method of extracting the feature point FP and the local feature include known methods such as SIFT.

The local feature extraction unit 11 calculates the depth of each feature point FP included in the current image IMA. For example, in a case where the camera 30 is a stereo camera, the local feature extraction unit 11 calculates parallax from the photographic images IM of the plurality of viewpoints captured by the stereo camera, and obtains a depth of the feature point FP based on the calculated parallax. In a case where the camera 30 is a monocular camera, the local feature extraction unit 11 calculates moving parallax from a plurality of photographic images IM captured at different time points (positions), and calculates the depth of the feature point FP based on the calculated moving parallax.

The integration processing unit 12 acquires information regarding acceleration and angular velocity measured by the IMU 20. The integration processing unit 12 calculates a change amount in the position and orientation of the device based on the information regarding the acceleration and the angular velocity. The integration processing unit 12 integrates the change amounts in the position and orientation from the time of capturing the past image IMB to the time of capturing the current image IMA, and calculates the relative position and orientation between the imaging position and orientation in the past image IMB and the imaging position and orientation in the current image IMA.

For each of the plurality of feature points FP included in the current image IMA, the background weight calculation unit 13 calculates a weight corresponding to the probability that the feature point FP is a point on the stationary subject forming the background of the current image IMA. For example, the background weight calculation unit 13 extracts the current image IMA and the past image IMB (photographic image IM captured one or more frames before the current image IMA) from the time-series image data captured by the camera 30. The background weight calculation unit 13 calculates the weight of each feature point FP based on a result of comparison of information regarding a difference between the current image IMA and the past image IMB captured in time series and information regarding a difference predicted based on the measurement information obtained by the IMU. The background weight calculation unit 13 estimates background information included in the current image IMA by using image information of the past image IMB temporally close to the current image IMA, in addition to the current image IMA used as a query for searching the keyframe image 41.

Figure 3:
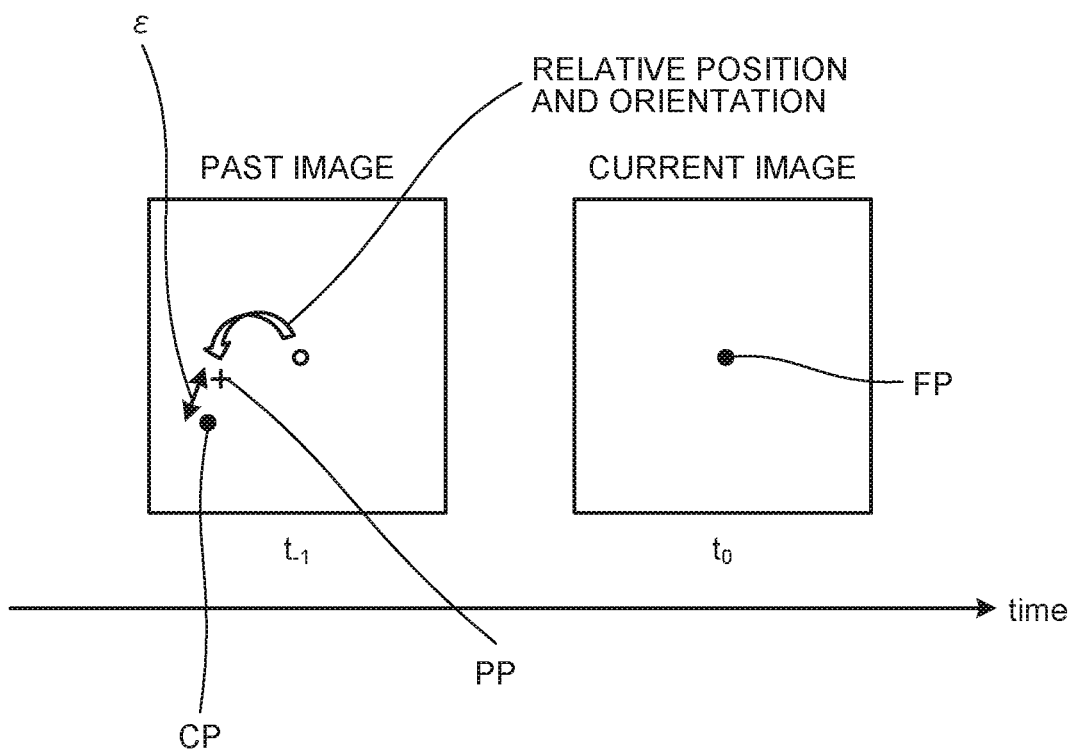
FIG. 3 is a diagram illustrating an example of a method of calculating a weight.

FIG. 3 is a diagram illustrating an example of a method of calculating a weight. The current image IMA is the photographic image IM captured at time $t_0$, and the past image IMB is the photographic image IM captured at time $t_{-1}$.

The background weight calculation unit 13 performs block matching between the current image IMA and the past image IMB based on the information acquired from the local feature extraction unit 11, and detects a plurality of corresponding points CP of the past image IMB corresponding to a plurality of feature points FP included in the current image IMA. The background weight calculation unit 13 predicts the positions of the plurality of feature points FP of the current image IMA in the past (time $t_{-1}$) based on the measurement information obtained by the IMU 20. The background weight calculation unit 13 calculates the weight of each of the plurality of feature points FP of the current image IMA based on a result of comparison of the predicted past positions of the plurality of feature points FP in the current image IMA and the predicted positions of the plurality of corresponding points CP in the past image IMB.

For example, based on the information regarding the relative position and orientation acquired from the integration processing unit 12, the background weight calculation unit 13 extracts a point at a position where the feature point FP is predicted to exist in the past image IMB as a predicted point PP for each feature point FP. When the position of the corresponding point CP is close to the position of the predicted point PP, the background weight calculation unit 13 determines that the feature point FP is a point on the stationary object with high probability. The background weight calculation unit 13 assigns a larger weight to the feature point FP having a higher probability of belonging to the background.

For example, the background weight calculation unit 13 sets a weight w of each feature point FP based on the following Formulas (1) to (6).

$$w = C/(C-\varepsilon) \quad (1)$$

$$\varepsilon = |u_{t-1} - v_{t-1}| \quad (2)$$

$$v_{t-1} = (1/z_{t-1})L \quad (3)$$

$$L = K(\Delta R' z_t K^{-1} u_t + \Delta p') \quad (4)$$

$$\Delta R' = \Delta R^T \quad (5)$$

$$\Delta p' = \prime p^T \quad (6)$$

In Formulas (1) to (6), w represents a weight of the feature point FP. C is a constant. $u_t$ indicates a position of feature point FP on the current image IMA. $u_{t-1}$ indicates a position of the corresponding point CP on the past image IMB. $v_{t-1}$ indicates a position of the feature point FP on the past image IMB. $\varepsilon$ represents a shift of the corresponding point CP from the predicted point PP (representing a distance between the predicted point PP and the corresponding point CP). $z_t$ indicates a depth of the feature point of the current image IMA. $z_{t-1}$ represents the z coordinate of L. $\Delta R$ indicates a change in the imaging orientation from time $t_{-1}$ to time $t_0$, which is calculated based on the measurement information obtained by the IMU 20. K indicates an internal parameter of the camera. $\Delta R'$ indicates a change in the imaging orientation from time $t_0$ to time $t_{-1}$, obtained by inversely converting $\Delta R$. $\Delta p$ indicates a change in the imaging position from time $t_{-1}$ to time $t_0$, which is calculated based on the measurement information obtained by the IMU 20. $\Delta p'$ indicates a change in the imaging position from time $t_0$ to time $t_{-1}$ obtained by inversely converting $\Delta p$. The constant C is appropriately set according to the specification of the device to be a target of the position and orientation estimation.

Returning to FIG. 2, the image search unit 14 searches for the keyframe image 41 similar to the current image IMA using the image feature amount in the current image IMA corrected based on the weight w of each feature point FP.

The image search unit 14 includes, for example, an image feature amount calculation unit 141 and an image feature amount collation unit 142.

The image feature amount calculation unit 141 weights the local feature of each feature point FP by the weight w to calculate the image feature amount. The image feature amount is calculated using a known method such as BoVW and VLAD, and the weight w for each feature point FP is added in the calculation. For example, the image feature amount calculation unit 141 calculates the image feature amount of the current image IMA based on the following Formula (7). The image feature amount calculation unit 141 increases the contribution ratio of the point on the stationary object by weighting the distance calculation between each local feature and the nearest centroid.

$$V = \Sigma_i w_i a(v_i - c) \quad (7)$$

In Formula (7), V represents an image feature amount. $w_i$ represents a weight of the i-th feature point FP. a indicates a cluster indicator. $v_i$ represents the local feature of the i-th feature point FP. c represents a centroid.

The image feature amount collation unit 142 collates the image feature amount with the information regarding the plurality of keyframe images 41 registered in the environmental map MP, and extracts information regarding the keyframe image 41 having the image feature amount closest to the image feature amount in the current image IMA.

The feature matching unit 15 extracts a plurality of corresponding point pairs from the current image IMA and the keyframe image 41 based on image information regarding the extracted keyframe image 41 (information regarding the local feature of the feature point RFP) and the image information regarding the current image IMA (information regarding the local feature of the feature point FP). The corresponding point pair is a pair of feature points corresponding to each other in the current image IMA and the keyframe image 41.

The position/orientation estimation unit 16 compares the current image IMA with the information regarding the keyframe image 41 based on the calculation result reflecting the weight w of each feature point FP in the current image IMA, and estimates the position and orientation of the device that has captured the current image IMA based on the comparison result. The position/orientation estimation unit 16 includes an outlier removal unit 161 and an orientation calculation unit 162, for example.

The outlier removal unit 161 extracts a plurality of inlier pairs by robust estimation from a plurality of corresponding point pairs which has been prioritized according to the weight w among a plurality of corresponding point pairs extracted by the feature matching unit 15.

For example, the outlier removal unit 161 performs hypothesis verification based on robust estimation using the information acquired from the local feature extraction unit 11. Using hypothesis verification, the outlier removal unit 161 obtains a pair having the most coherent positional relationship between each feature point FP of the current image IMA and each feature point RFP of the keyframe image 41. The outlier removal unit 161 removes an incoherent corresponding point pair (for example, one feature point of the corresponding point pair is a point on a moving subject, or one feature point is hidden) with respect to the positional relationship obtained by hypothesis verification. This results in extraction of a plurality of inlier pairs having high reliability as corresponding points. It is possible to obtain, from the positional relationship obtained by the hypothesis verification, a tentative relative position and orientation between the imaging position and orientation of the current image IMA and the imaging position and orientation of the keyframe image 41.

Hypothesis verification uses a P3P algorithm, for example. In the P3P algorithm, the tentative relative position and orientation is obtained by three corresponding point pairs selected from all the corresponding point pairs. At this time, the three corresponding point pairs are not randomly selected as performed in RANSAC, but sampling is prioritized by the weight w as in Formula (8) using Progressive Sample Consensus (PROSAC). This increases the probability that the tentative relative position and orientation is obtained only from the point on the stationary object.

$$\{u_{j,t}u_{j,t-x}\}=\text{PROSAC}(\{u_{j,t}u_{j,t-x}\},\{w_j\}) \quad (8)$$

In Formula (8), $u_{j,t}$ represents the position of the j-th feature point FP of the current image IMA. $u_{j,t-x}$ represent the position of the j-th feature point RFP in the keyframe image 41. $w_j$ represents the weight of the j-th feature point FP.

In a real-time system, it is difficult to perform sampling corresponding point pairs by the number of all combinations in terms of processing latency. Therefore, the real-time operation capability may be maintained by terminating the number of times of sampling at a fixed number of times. At this time, by prioritizing the sampling as described above, even when the number of times of sampling is terminated at a fixed number of times, it is likely to select a point on a stationary object as an inlier pair.

The orientation calculation unit 162 calculates the position and orientation of the device using a regression analysis model in which a contribution degree of each of the inlier pairs has been corrected based on the weight w of each of the feature points FP of the current image IMA. For example, the orientation calculation unit 162 calculates a relative position and orientation between the imaging position and orientation of the current image IMA and the imaging position and orientation of the keyframe image 41 from the positional relationship among a plurality of corresponding point pairs extracted as an inlier pair. At this time, by adding the weight w for each feature point FP, the orientation calculation unit 162 obtains the relative position and orientation so as to reduce a reprojection error between the corresponding point pair having a high probability of being a point pair on a stationary object among the inlier pairs. The orientation calculation unit 162 adds the calculated relative position and orientation to the imaging position and orientation associated with the keyframe image 41 to calculate the current position and orientation of the device (imaging position and orientation of the current image IMA).

The calculation of the relative position and orientation uses a PnP algorithm, for example. The orientation calculation unit 162 obtains the relative position and orientation based on all the inlier pairs. For example, the orientation calculation unit 162 calculates a distance between the feature points for each of the inlier pairs according to the following Formula (9). The orientation calculation unit 162 calculates a weighted sum of squares of the distance using the weight w calculated for each feature point FP. The orientation calculation unit 162 calculates the position and orientation of the device with the minimum weighted sum of squares.

$$\Delta T = \text{argmin} \Sigma_j w_j |u_{j,t} - \text{proj}(\Delta T x_{j,t-x})|^2 \quad (9)$$

In Formula (9), $\Delta T$ represents the relative position and orientation. $x_j$ represents a three-dimensional coordinate with respect to the feature $u_j$. proj represents a function of projecting a three-dimensional coordinate point onto two-dimensional coordinates of a camera screen. The function proj satisfies the following Formula (10).

$$\text{proj}(x) = (1/z)Kx \quad (10)$$

In Formula (10), x represents a three-dimensional coordinate point. K represents an internal parameter (3×3 matrix) of the camera. z indicates a depth (z coordinate) of Kx.

[1-2. Information Processing Method]

Figure 4:
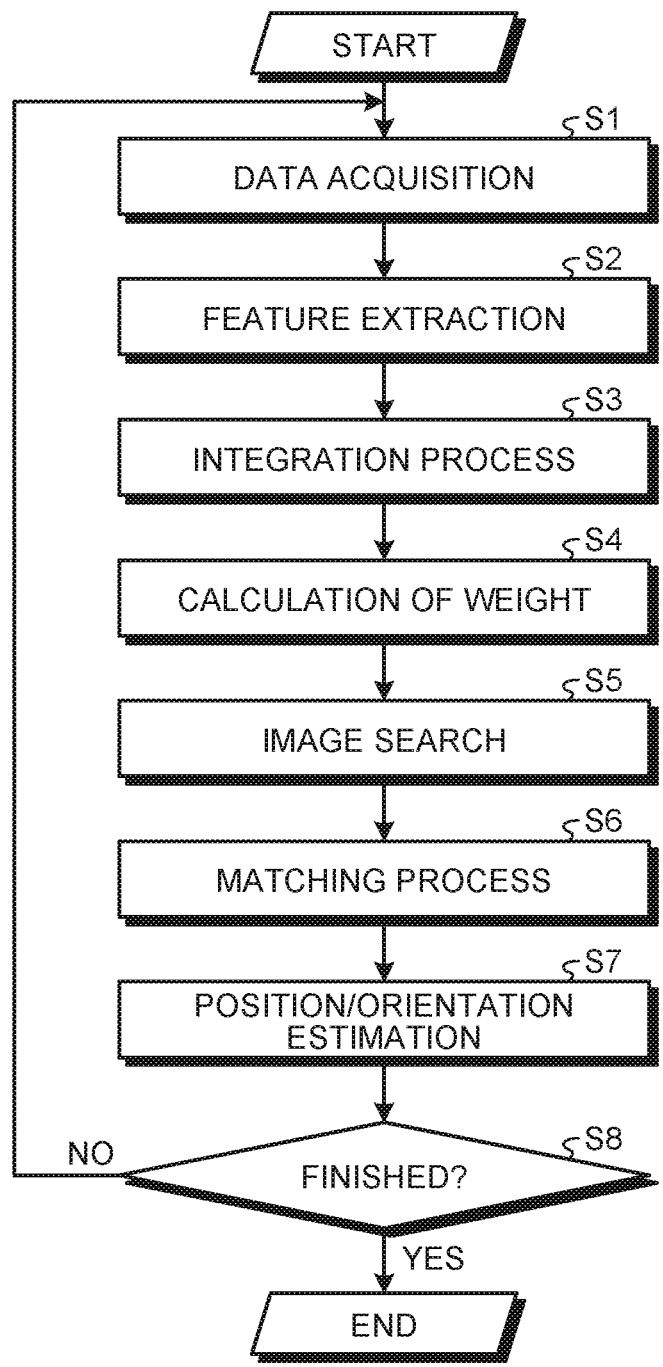
FIG. 4 is a flowchart illustrating an information processing method.

FIG. 4 is a flowchart illustrating an information processing method according to the present embodiment.

In Step S1, the processing unit 10 acquires information regarding the acceleration and the angular velocity measured by the IMU 20. In addition, the processing unit 10 acquires time-series image data including the current image IMA and the past image IMB.

In Step S2, the local feature extraction unit 11 extracts a plurality of feature points FP from the current image IMA, and extracts a local feature for each of the feature points FP. In addition, the local feature extraction unit 11 calculates the depth of each of the feature points FP.

In Step S3, based on the information regarding the acceleration and the angular velocity measured by the IMU 20, the integration processing unit 12 integrates the change amounts in the position and orientation of the device from the time of capturing the past image IMB to the time of capturing the current image IMA.

In Step S4, the background weight calculation unit 13 performs block matching between the current image IMA and the past image IMB, and detects a plurality of corresponding points CP in the past image IMB corresponding to a plurality of feature points FP included in the current image IMA. Based on the change amount of the position ad orientation calculated by the integration processing unit 12, the background weight calculation unit 13 compares the feature point FP with the corresponding point CP. Based on a result of comparison between the feature point FP and the corresponding point CP, the background weight calculation unit 13 obtains a probability that the feature point FP is a point on a stationary subject forming the background of the current image IMA, and assigns a weight w according to the probability to the feature point FP.

In Step S5, using the image feature amount of the current image IMA corrected based on the weight w of each feature point FP, the image search unit 14 searches for the keyframe image 41 similar to the current image IMA from the plurality of keyframe images 41. The image search unit 14 extracts, from the environmental map MP, information regarding the position and orientation associated with the keyframe image 41 obtained by the search.

In Step S6, the feature matching unit 15 extracts a plurality of corresponding point pairs from the current image IMA and the keyframe image 41 based on image information regarding the keyframe image 41 (information regarding the local feature of the feature point RFP) and the image information regarding the current image IMA (information regarding the local feature of the feature point FP).

In Step S7, the position/orientation estimation unit 16 estimates the position and orientation of the current device (the imaging position and orientation of the current image IMA) based on the information regarding the positional relationship between the plurality of feature points FP in the current image IMA and the plurality of corresponding feature points RFP in the keyframe image 41 and based on the information regarding the imaging position and orientation of the keyframe image 41 registered in the environmental map MP.

In Step S8, the processing unit 10 determines whether the processing has been finished. Whether the processing has been finished is detected by an operation of an image shooting button of the camera 30 or the like. In a case where it is determined in Step S8 that the processing has been finished (Step S8: Yes), the processing ends. In a case where there is no determination that the processing has been finished in Step S8 (Step S8: No), the processing returns to Step S1, and the above-described steps are repeated until the processing is finished.

[1-3. Effects]

The processing unit 10 includes the background weight calculation unit 13 and the position/orientation estimation unit 16. For each of the plurality of feature points FP included in the current image IMA, the background weight calculation unit 13 calculates the weight w corresponding to the probability that the feature point FP is a point on a stationary subject forming the background of the current image IMA. Based on the calculation result reflecting the weight w of each feature point FP, the position/orientation estimation unit 16 compares the current image IMA with the information regarding the keyframe image 41 registered in the environmental map MP, and estimates the position and orientation of the device that has captured the current image IMA. With the information processing method of the present embodiment, the information processing of the processing unit 10 described above is executed by a computer. The program of the present embodiment causes the computer to implement information processing of the processing unit 10 described above.

According to this configuration, different weights are given to the information regarding the feature points FP depending on whether the feature point FP included in the current image IMA belongs to the background (stationary subject) or the foreground (moving subject). Therefore, even if a disturbance such as a moving object is included in the current image IMA, the estimation accuracy of the position and orientation is not likely to be impaired.

The processing unit 10 includes the image search unit 14. The image search unit 14 searches for the keyframe image 41 similar to the current image IMA using the image feature amount of the current image IMA corrected based on the weight w of each feature point FP.

This configuration leads to calculation of the image feature amount strongly reflecting the information of the stationary subject. This makes it possible to estimate the position and orientation of the device with high accuracy.

The image search unit 14 includes the image feature amount calculation unit 141 and the image feature amount collation unit 142. The image feature amount calculation unit 141 weights the local feature of each feature point FP by the weight w to calculate the image feature amount. The image feature amount collation unit 142 collates the image feature amount with the information regarding the plurality of keyframe images 41 registered in the environmental map MP, and extracts information regarding the keyframe image 41 having the image feature amount closest to the image feature amount in the current image IMA.

According to this configuration, information regarding an appropriate keyframe image 41 having high similarity to the current image IMA is extracted.

The position/orientation estimation unit 16 includes the outlier removal unit 161. The outlier removal unit 161 extracts a plurality of inlier pairs by robust estimation from a plurality of pairs of feature points that have been prioritized according to the weight w among a plurality of pairs of feature points corresponding to each other in the current image IMA and the keyframe image 41.

According to this configuration, the feature point FP on the stationary subject is likely to be extracted as an inlier pair. This enhances the device orientation estimation accuracy.

The position/orientation estimation unit 16 includes the orientation calculation unit 162. The orientation calculation unit 162 calculates the position and orientation of the device using a regression analysis model in which the contribution degree of each of the inlier pairs has been corrected based on the weight w of each of the feature points FP. For example, the orientation calculation unit calculates the distance between the feature points for each of the inlier pairs, calculates the weighted sum of squares of the distance using the weight w calculated for each feature point FP, and then calculates the position and orientation of the device minimizing the weighted sum of squares.

This configuration makes it possible to estimate the position and orientation reflecting the information regarding the stationary subject.

The background weight calculation unit 13 calculates the weight w of each feature point FP based on a result of comparison between information regarding the difference in the photographic images IM at a plurality of time points captured in time series and information regarding the difference predicted based on the measurement information obtained by the IMU 20.

According to this configuration, the weight w of each feature point FP is appropriately set based on the measurement information obtained by the IMU 20.

2. Second Embodiment

Figure 5:
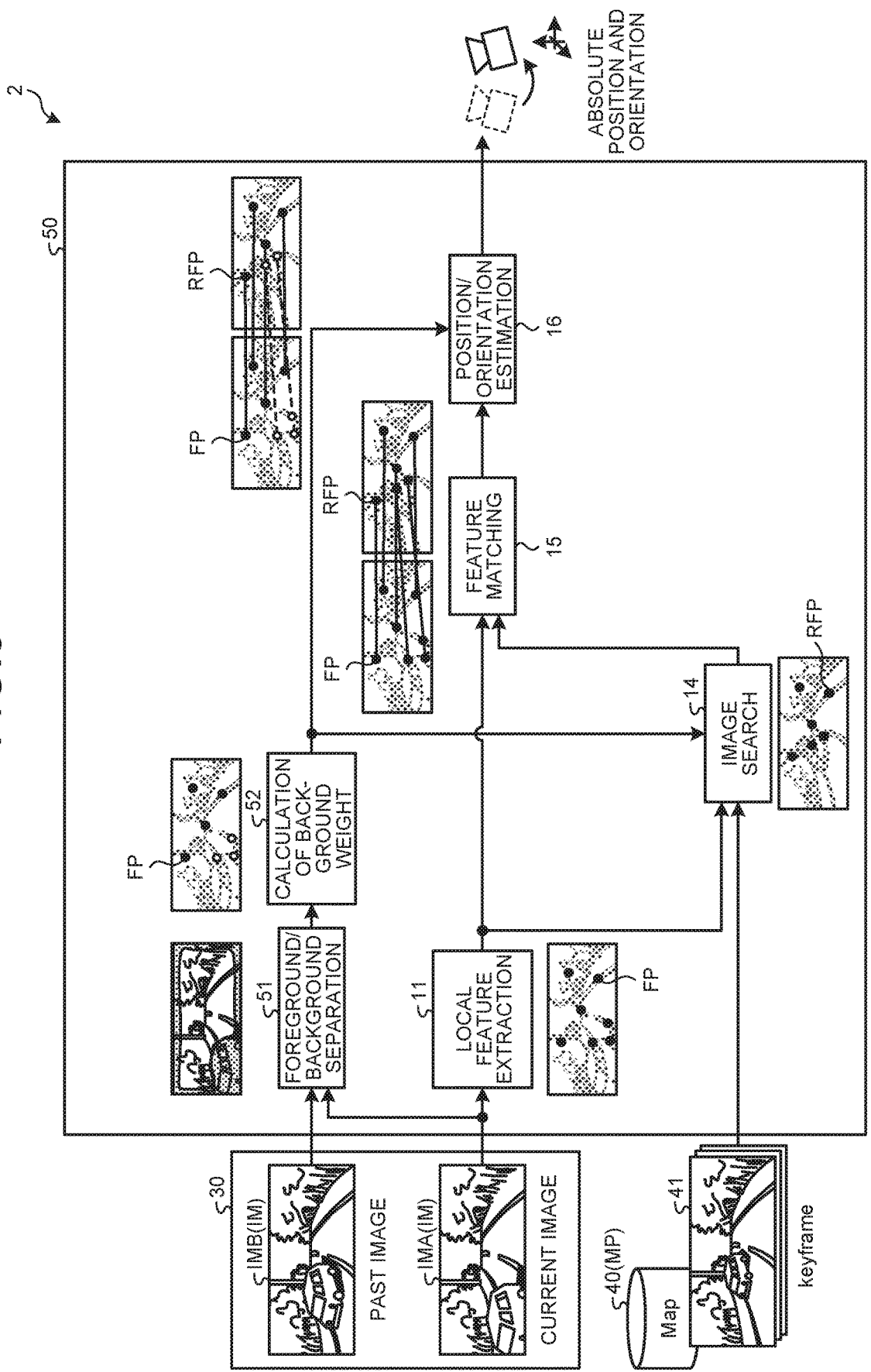
FIG. 5 is a schematic diagram of an information processing system according to a second embodiment.

FIG. 5 is a schematic diagram of an information processing system 2 according to a second embodiment.

The present embodiment is different from the first embodiment in that the weight w of each feature point FP is calculated based only on the image information regarding the current image IMA and the past image IMB using a machine learning method. Hereinafter, differences from the first embodiment will be mainly described.

In the present embodiment, the weight w of each feature point FP is calculated based only on the image information of the current image IMA and the past image IMB. For example, a processing unit 50 includes a foreground/background separation unit 51 that separates the foreground and the background from each other using an analysis model that uses a deep neural network (DNN). The foreground/background separation unit 51 extracts a probability that a pixel is a point on a stationary subject for each of a plurality of pixels included in the current image IMA. The foreground/background separation unit 51 outputs information regarding the probability of each pixel as a point on the stationary subject, as separation information. A background weight calculation unit 52 calculates the weight w of each feature point FP included in the current image IMA based on the foreground/background separation information obtained by the DNN.

The foreground/background separation unit 51 uses the supervised data to perform machine learning so that separation information is output from the current image IMA and the past image IMB. The foreground/background separation unit 51 outputs, as the separation information, information regarding the weight having a number corresponding to the image resolution (or the down-converted image resolution) of the current image IMA. Therefore, the background weight calculation unit 52 extracts information regarding the weight of each feature point FP in the current image IMA from the information regarding the weight of each pixel included in the separation information.

In the present embodiment, the weight w of each feature point FP is calculated based on only the image information regarding the current image IMA and the past image IMB using a machine learning method. This eliminates the necessity of the IMU 20, leading to simplification of the apparatus configuration.

Although the present embodiment is an example in which the separation information is extracted based on the image information regarding the current image IMA and the past image IMB, the method of extracting the separation information is not limited to this example. For example, the separation information may be extracted based only on the image information regarding the current image IMA using a technique such as semantic segmentation.

3. Third Embodiment

Figure 6:
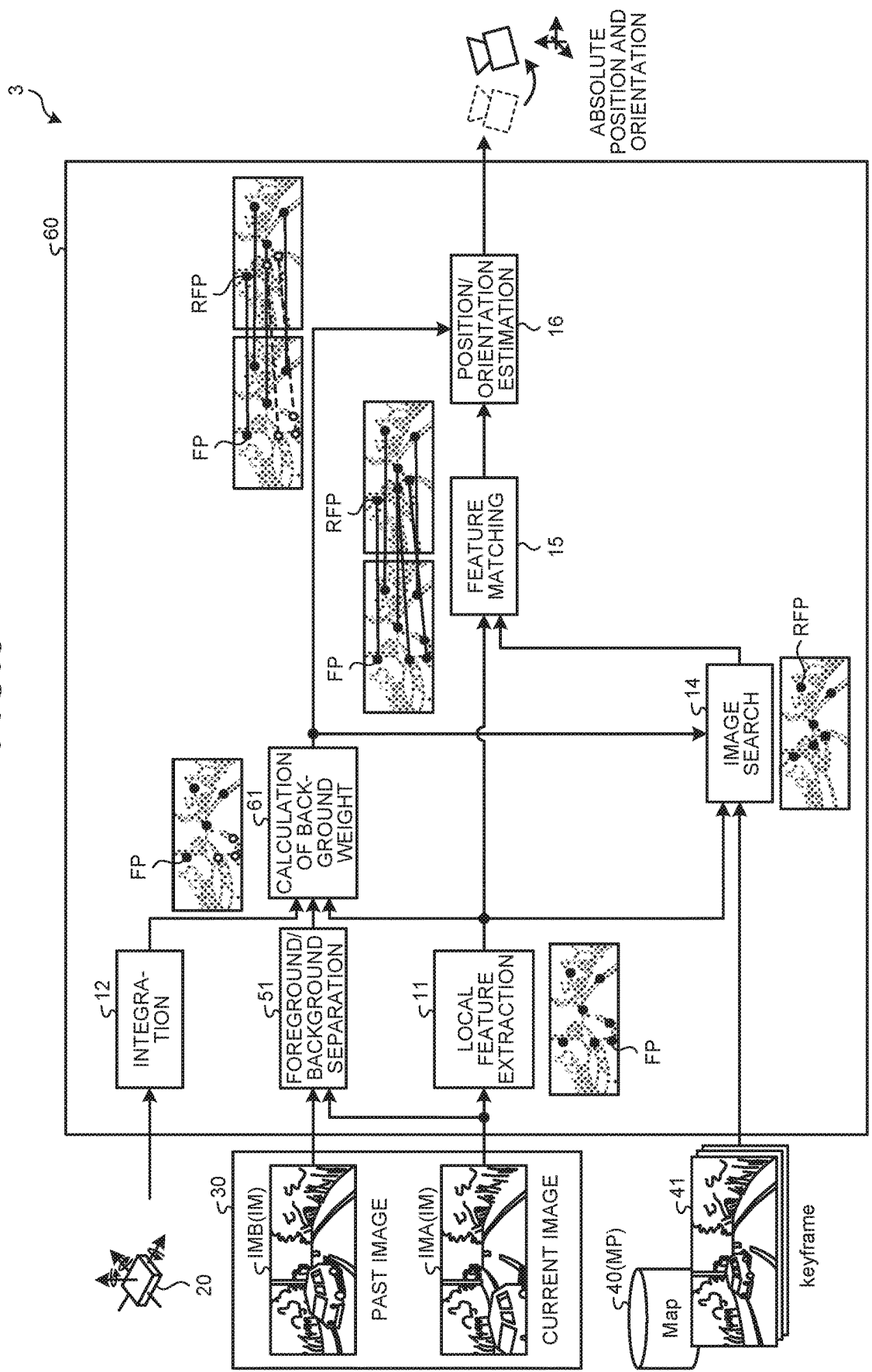
FIG. 6 is a schematic diagram of an information processing system according to a third embodiment.

FIG. 6 is a schematic diagram of an information processing system 3 according to a third embodiment.

In the present embodiment, a processing unit 60 uses, as the method of estimating the position and orientation, a method obtained by mixing the method (first method) described in the first embodiment and the method (second method) described in the second embodiment.

Similarly to the first embodiment, a background weight calculation unit 61 first calculates a weight (first weight w1) of each feature point FP based on a result of comparison between information regarding a difference in the photographic images IM (the current image IMA and the past image IMB) at the plurality of time points captured in time series and the information regarding a difference predicted based on the measurement information obtained by the IMU 20. Next, similarly to the second embodiment, the background weight calculation unit 61 calculates a weight (second weight w2) of each feature point FP based on the foreground/background separation information obtained by a DNN. The background weight calculation unit 61 calculates the weight w of each feature point FP by blending the first weight w1 and the second weight w2 at a blend ratio α based on the following Formula (11).

$$w = \alpha \times w1 + (1-\alpha) \times w2 \quad (11)$$

The blend ratio α is determined according to the measurement information obtained by the IMU 20. That is, in the first method, background information is estimated using an actual measurement value of the IMU 20. Therefore, the background estimation accuracy by the first method is higher than the accuracy obtained by the second method using machine learning. However, the IMU 20 has an expressible range. Therefore, at the time of occurrence of a large translational or rotational movement exceeding a range, there is a possibility of saturation of the measured value. Therefore, the background weight calculation unit 61 defines the reliability of the measurement information obtained by the IMU 20 as the blend ratio α. When a steep movement change is detected by the IMU 20, the background weight calculation unit 61 decreases the blend ratio α so as to increase the contribution ratio of the second weight w2 calculated using DNN. This improves robustness.

Figure 7:
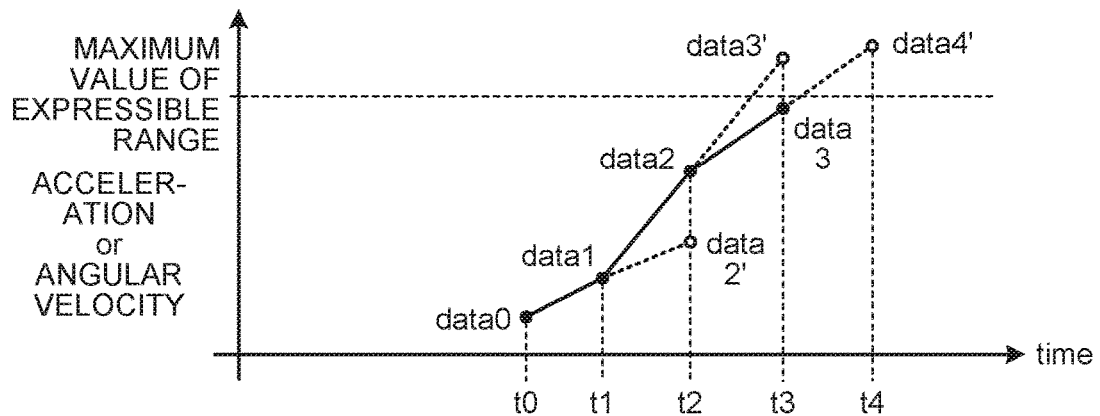
FIG. 7 is a diagram illustrating an example of a method of determining a blend ratio.

FIG. 7 is a diagram illustrating an example of a method of determining the blend ratio α. In the graph of FIG. 7, a horizontal axis is time, and a vertical axis is a measured value (acceleration or angular velocity) of the IMU 20. $data_i$ (i is an integer) indicates a measured value (actual measurement value) at time $t_i$. $data_i'$ indicates a predicted value of the measured value at time $t_{i+1}$ predicted based on a gradient of the measured value at time $t_i$.

For example, the background weight calculation unit 61 determines reliability r of the measured value $data_i$ based on the measured value $data_i$ and the gradient at time $t_i$. The background weight calculation unit 61 calculates the blend ratio α by the following Formula (12) using a constant D.

$$\alpha = D/(D+r) \quad (12)$$

For example, in a case where the predicted value $data_i'$ is larger than a threshold (for example, a maximum measurable range by the IMU 20), the background weight calculation unit 61 calculates the reliability r as a difference ($data_i - data_{i-1}$) between the $data_i$ and the $data_{i-1}$. In this case, the blend ratio α is calculated as $D/(D+data_i - data_{i-1})$. When the predicted value $data_i'$ is the threshold or less, the background weight calculation unit 61 calculates the reliability r as zero. In this case, the blend ratio α is calculated as 1.

In the above example, when the predicted value $data_i'$ exceeds the threshold, the reliability r and the blend ratio α continuously change according to the measured value $data_i$. However, when the predicted value $data_i'$ exceeds the threshold, the reliability r can be set to infinity, and the blend ratio α can be fixed to zero. In this case, the method of setting the weight w is switched between the first method and the second method according to the measurement information obtained by the IMU 20.

As described above, the present embodiment adjusts the blend ratio α according to the measurement information obtained by the IMU 20. This makes it possible to appropriately set the weight w according to the reliability of the measurement information obtained by the IMU 20.

4. Configuration Example of Computer

The above-described series of processing can be executed by hardware or software. In a case where the series of processing is executed by software, a program constituting the software is installed in a computer. Here, the computer includes various computers such as a computer incorporated in dedicated hardware or a general-purpose personal computer capable of executing various functions by installing various programs, for example.

Figure 8:
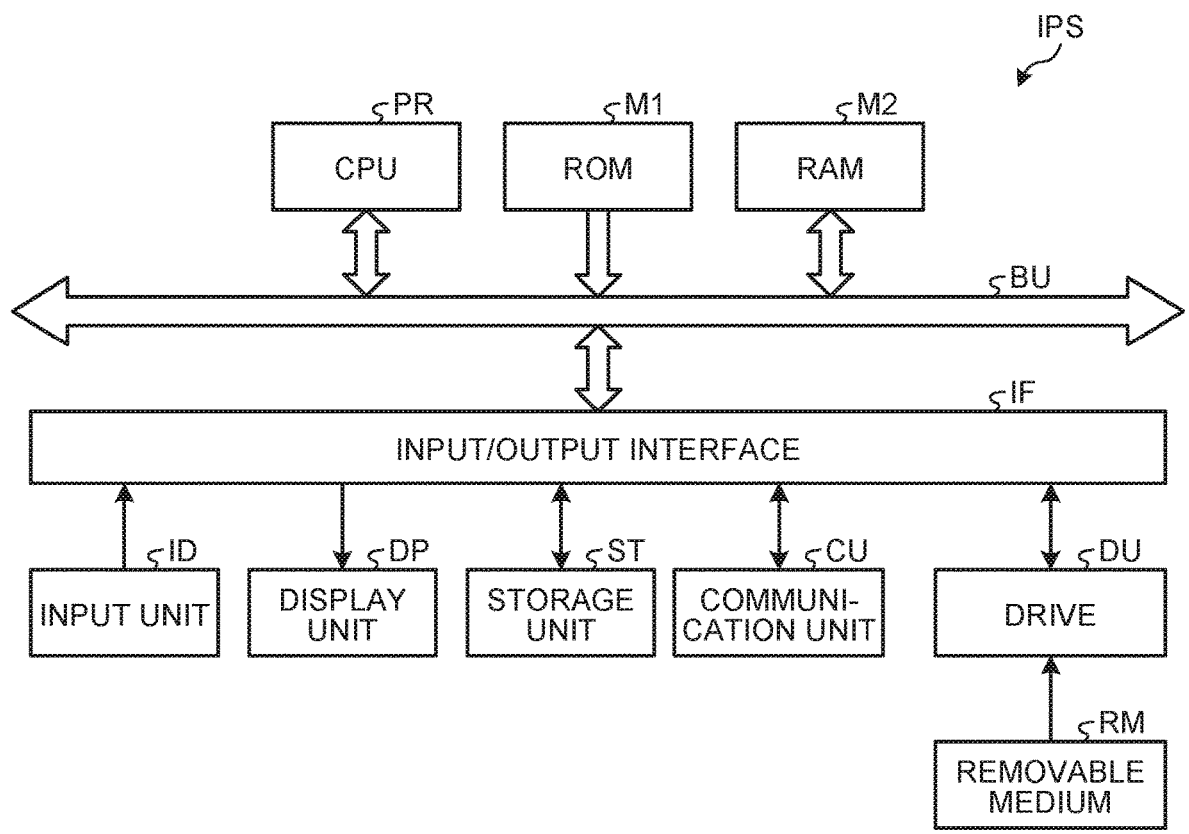
FIG. 8 is a block diagram illustrating a configuration example of hardware of a computer.

FIG. 8 is a block diagram illustrating a hardware configuration example of a computer IPS that executes the above-described series of processing by a program. The computer IPS corresponds to the information processing system of each embodiment described above.

In the computer IPS, a central processing unit (CPU) PR, read only memory (ROM) M1, and random access memory (RAM) M2 are mutually connected by a bus BU.

The bus BU is further connected to an input/output interface IF. The input/output interface IF is connected with an input unit ID, an output unit DP, a storage unit ST, a communication unit CU, and a drive DU. The storage unit 40 of the above-described embodiments is included in the storage unit ST.

The input unit ID includes an input switch, a button, a microphone, an imaging element, and the like. The IMU 20 and the camera 30 of the above-described embodiments are included in the input unit ID. The output unit DP includes a display, a speaker, and the like. The storage unit ST includes a hard disk, nonvolatile memory, and the like. The communication unit CU includes a network interface and the like. The drive DU drives a removable recording medium RM such as a magnetic disk, an optical disk, a magneto-optical disk, or semiconductor memory.

In the computer IPS configured as described above, for example, the CPU PR loads a program stored in the storage unit ST into the RAM M2 via the input/output interface IF and the bus BU and executes the program, whereby the above-described series of processing is performed.

The program executed by the computer IPS (CPU PR) can be provided as a recorded program in the removable recording medium RM being a package medium or the like, for example. Note that the program can be provided via a wired or wireless transmission medium such as a local area network, the Internet, or digital satellite broadcasting.

In the computer IPS, the program can be installed in the storage unit ST via the input/output interface IF by using the removable recording medium RM inserted to the drive DU. Furthermore, the program can be received by the communication unit CU via a wired or wireless transmission medium and installed in the storage unit ST. In addition, the program can be preinstalled in the ROM M1 or the storage unit ST.

Note that the program executed by the computer may be a program that executes processing in time series in the order described in the present specification, or may be a program that executes processing in parallel or as appropriate at necessary timing such as being called.

In the present specification, a system represents a set of a plurality of constituents (devices, modules (components), or the like), regardless of whether all the constituents are located in a same housing. Therefore, a plurality of devices housed in separate housings and connected via a network, and one device having a plurality of modules stored in one housing, are both systems.

Furthermore, the embodiment of the present technology is not limited to the above-described embodiment, and various modifications can be made without departing from the scope and spirit of the present technology.

Furthermore, for example, the present technology can adopt a configuration of cloud computing in which one function is cooperatively shared and processed by a plurality of devices via a network.

Furthermore, individual steps described in the above-described flowchart can be executed by one device or can be executed by a plurality of devices in shared operation.

Furthermore, when one step includes a plurality of processes, the plurality of processes included in the one step can be executed by one device or can be executed by a plurality of devices in shared operation.

The effects described in the present specification are merely examples, and thus there may be other effects, not limited to the exemplified effects.

Note that the present technique can also have the following configurations.

(1)
An information processing apparatus comprising:
a background weight calculation unit that calculates, for each of a plurality of feature points included in a photographic image, a weight according to a probability that the feature point is a point on a stationary subject forming a background of the photographic image; and
a position/orientation estimation unit that compares the photographic image with information regarding a keyframe image registered in an environmental map based on a calculation result reflecting the weight of each of the feature points, and estimates a position and orientation of a device that has captured the photographic image.

(2)
The information processing apparatus according to (1), further comprising an image search unit that searches for the keyframe image similar to the photographic image by using an image feature amount of the photographic image corrected based on the weight of each of the feature points.

(3)
The information processing apparatus according to (2), wherein the image search unit includes: an image feature amount calculation unit that calculates the image feature amount by weighting a local feature of each of the feature points by the weight; and an image feature amount collation unit that collates the image feature amount with information regarding a plurality of keyframe images registered in an environmental map and extracts information regarding the keyframe image having an image feature amount closest to the image feature amount.

(4)
The information processing apparatus according to (2) or (3),
wherein the position/orientation estimation unit includes an outlier removal unit that extracts a plurality of inlier pairs by robust estimation from a plurality of pairs of feature points prioritized according to the weight among a plurality of pairs of feature points corresponding to each other in the photographic image and the keyframe image.

(5)
The information processing apparatus according to (4),
wherein the position/orientation estimation unit includes an orientation calculation unit that calculates a position and orientation of the device by using a regression analysis model in which a contribution degree of each of the inlier pairs has been corrected based on the weight of each of the feature points.

(6)
The information processing apparatus according to (5),
wherein the orientation calculation unit calculates a distance between the feature points for each of the inlier pairs, calculates a weighted sum of squares of the distance using the weight calculated for each of the feature points, and calculates the position and orientation of the device minimizing the weighted sum of squares.

(7)
The information processing apparatus according to any one of (1) to (6),
wherein the background weight calculation unit calculates the weight of each of the feature points based on a result of comparison between information regarding a difference in photographic images captured in time series at a plurality of time points and information regarding a difference predicted based on measurement information obtained by an inertial measurement unit (IMU).

(8)
The information processing apparatus according to any one of (1) to (6),
wherein the background weight calculation unit calculates the weight of each of the feature points based on foreground/background separation information obtained by using a deep neural network (DNN).

(9)

The information processing apparatus according to any one of (1) to (6),
wherein the background weight calculation unit blends the weight calculated based on a result of comparison between information regarding a difference in photographic images captured in time series at a plurality of time points and information regarding a difference predicted based on measurement information obtained by an IMU and the weight calculated based on foreground/background separation information obtained by using a DNN, the blending performed at a blend ratio corresponding to the measurement information obtained by the IMU.

(10)

An information processing method to be executed by a computer, the method comprising:
calculating, for each of a plurality of feature points included in a photographic image, a weight according to a probability that the feature point is a point on a stationary subject forming a background of the photographic image; and
comparing the photographic image with information regarding a keyframe image registered in an environmental map based on a calculation result reflecting the weight of each of the feature points, and estimating a position and orientation of a device that has captured the photographic image.

(11)

A program causing a computer to execute operations, the operations comprising:
calculating, for each of a plurality of feature points included in a photographic image, a weight according to a probability that the feature point is a point on a stationary subject forming a background of the photographic image; and
comparing the photographic image with information regarding a keyframe image registered in an environmental map based on a calculation result reflecting the weight of each of the feature points, and estimating a position and orientation of a device that has captured the photographic image.

REFERENCE SIGNS LIST 1, 2, 3 INFORMATION PROCESSING SYSTEM
10, 50, 60 PROCESSING UNIT (INFORMATION PROCESSING APPARATUS)
13, 52, 61 BACKGROUND WEIGHT CALCULATION UNIT
14 IMAGE SEARCH UNIT
16 POSITION/ORIENTATION ESTIMATION UNIT
20 IMU
41 KEYFRAME IMAGE
141 IMAGE FEATURE AMOUNT CALCULATION UNIT
142 IMAGE FEATURE AMOUNT COLLATION UNIT
161 OUTLIER REMOVAL UNIT
162 ORIENTATION CALCULATION UNIT
CP CORRESPONDING POINT
FP FEATURE POINT
IM PHOTOGRAPHIC IMAGE
MP ENVIRONMENTAL MAP
w WEIGHT
α BLEND RATIO

The invention claimed is:

1. An information processing apparatus, comprising:
a central processing unit (CPU) configured to:
predict a first difference between photographic images based on measurement information from an inertial measurement unit (IMU),
wherein the photographic images are captured by a device in time series at a plurality of time points;
compare first information regarding the predicted first difference in the photographic images with second information regarding a second difference in the photographic images;
calculate, for each of a plurality of feature points included in a photographic image of the photographic images, a first weight based on
a probability that the each of the plurality of feature points is a point on a stationary subject that forms a background of the photographic image, and
a result of the comparison of the first information with the second information;
compare, based on the calculated first weight of the each of the plurality of feature points, the photographic image with third information regarding a keyframe image registered in an environmental map; and
estimate a position and an orientation of the device based on a result of the comparison of the photographic image with the third information.

2. The information processing apparatus according to claim 1, wherein the CPU is further configured to:
calculate an image feature amount of the photographic image based on the first weight of the each of the plurality of feature points; and
search for the keyframe image similar to the photographic image based on the image feature amount of the photographic image.

3. The information processing apparatus according to claim 2, wherein the CPU is further configured to:
calculate the image feature amount of the photographic image based on the first weight associated with a local feature of the each of the plurality of feature points;
collate the image feature amount of the photographic image with information regarding a plurality of keyframe images registered in the environmental map, wherein the plurality of keyframe images includes the keyframe image; and
extract the third information regarding the keyframe image, wherein the keyframe image among the plurality of keyframe images has an image feature amount closest to the image feature amount of the photographic image.

4. The information processing apparatus according to claim 2, wherein
the CPU is further configured to extract, by robust estimation, a plurality of inlier pairs from a first plurality of pairs of feature points,
the first plurality of pairs of feature points is prioritized among a second plurality of pairs of feature points based on the first weight, and
the second plurality of pairs of features points corresponds to the photographic image and the keyframe image.

5. The information processing apparatus according to claim 4, wherein
the CPU is further configured to calculate the position and the orientation of the device based on a regression analysis model, and in the regression analysis model, a contribution degree of each of the plurality of inlier pairs is corrected based on the first weight of the each of the plurality of feature points.

6. The information processing apparatus according to claim 5, wherein the CPU is further configured to:
    calculate a distance between the plurality of feature points for the each of the plurality of inlier pairs;
    calculate a weighted sum of squares of the distance based on the first weight of the each of the plurality of feature points; and
    calculate the position and the orientation of the device by minimization of the weighted sum of squares.

7. The information processing apparatus according to claim 1, wherein the CPU is further configured to:
    acquire foreground/background separation information based on a deep neural network (DNN); and
    calculate the first weight of the each of the plurality of feature points based on the foreground/background separation information.

8. The information processing apparatus according to claim 1, wherein the CPU is further configured to:
    acquire foreground/background separation information based on a deep neural network (DNN);
    calculate a second weight based on the foreground/background separation information; and
    blend the first weight and the second weight at a blend ratio corresponding to the measurement information.

9. An information processing method executed by a computer, the information processing method comprising:
    predicting a first difference between photographic images based on measurement information from an inertial measurement unit (IMU),
        wherein the photographic images are captured by a device in time series at a plurality of time points;
    comparing first information regarding the predicted first difference in the photographic images with second information regarding a second difference in the photographic images;
    calculating, for each of a plurality of feature points included in a photographic image of the photographic images, a weight based on
        a probability that the each of the plurality of feature points is a point on a stationary subject forming a background of the photographic image, and
        a result of the comparison of the first information with the second information;
    comparing, based on the calculated weight of the each of the plurality of feature points, the photographic image with third information regarding a keyframe image registered in an environmental map; and
    estimating a position and an orientation of the device based on a result of the comparison of the photographic image with the third information.

10. A non-transitory computer-readable medium having stored thereon computer-executable instructions that, when executed by a computer, cause the computer to execute operations, the operations comprising:
    predicting a first difference between photographic images based on measurement information from an inertial measurement unit (IMU),
        wherein the photographic images are captured by a device in time series at a plurality of time points;
    comparing first information regarding the predicted first difference in the photographic images with second information regarding a second difference in the photographic images;
    calculating, for each of a plurality of feature points included in a photographic image of the photographic images, a weight based on
        a probability that the each of the plurality of feature points is a point on a stationary subject forming a background of the photographic image, and
        a result of the comparison of the first information with the second information;
    comparing, based on the calculated weight of the each of the plurality of feature points, the photographic image with third information regarding a keyframe image registered in an environmental map; and
    estimating a position and an orientation of the device based on a result of the comparison of the photographic image with the third information.

* * * * *